US011189910B2

(12) United States Patent
Oh et al.

(10) Patent No.: US 11,189,910 B2
(45) Date of Patent: Nov. 30, 2021

(54) ANTENNA AND CAP (71) Applicant: HEWLETT-PACKARD DEVELOPMENT COMPANY, L.P., Spring, TX (US)

(72) Inventors: Sung Oh, Palo Alto, CA (US); Philip Wright, Ottawa (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 212 days.

(21) Appl. No.: 16/596,691

(22) Filed: Oct. 8, 2019

(65) Prior Publication Data

US 2020/0058985 A1    Feb. 20, 2020

Related U.S. Application Data

(63) Continuation of application No. 15/772,080, filed as application No. PCT/US2016/018725 on Feb. 16, 2016, now Pat. No. 10,498,014.

(51) Int. Cl.
*H01Q 1/24* (2006.01)
*H01Q 1/42* (2006.01)
(Continued)

(52) U.S. Cl.
CPC .......... *H01Q 1/243* (2013.01); *G06F 1/1698* (2013.01); *H01Q 1/22* (2013.01); *H01Q 1/38* (2013.01);
(Continued)

(58) Field of Classification Search
CPC ............ H01Q 1/243; H01Q 1/22; H01Q 1/38; H01Q 1/42; H01Q 1/44; H01Q 9/40; G06F 1/1698
(Continued)

(56) References Cited

U.S. PATENT DOCUMENTS 6,687,120 B2   2/2004 Hood
7,541,992 B2*  6/2009 Murakami ............. H01Q 1/243
                                            343/702
(Continued)

FOREIGN PATENT DOCUMENTS

CN    102227036    10/2011
CN    103022647     4/2013
(Continued)

OTHER PUBLICATIONS

Larry Morrell, "Dual Tuning—The OEM's Secret Weapon in Spectrum Proliferation", Oct. 18, 2015.

*Primary Examiner* — Binh B Tran
(74) *Attorney, Agent, or Firm* — Brooks, Cameron & Huebsch PLLC (57) ABSTRACT

An antenna and cap, in an example implementation, can include a system, comprising a computing device, a clearance region coupled to the computing device, and an antenna comprising a first antenna portion and a second antenna portion. The first antenna portion can be coupled to the computing device and to the clearance region, and the second antenna portion can be coupled to the clearance region. The system can include a first cap coupled to the second antenna portion via a first interconnection, and a second cap coupled to the second antenna portion via a second interconnection. The first cap and the second cap can be coupled to the computing device.

15 Claims, 5 Drawing Sheets

(51) Int. Cl.
*H01Q 1/38* (2006.01)
*H01Q 1/22* (2006.01)
*H01Q 9/40* (2006.01)
*H01Q 1/44* (2006.01)
*G06F 1/16* (2006.01)

(52) U.S. Cl.
CPC ............... *H01Q 1/42* (2013.01); *H01Q 1/44* (2013.01); *H01Q 9/40* (2013.01)

(58) Field of Classification Search
USPC ......................................................... 343/702
See application file for complete search history.

(56) References Cited

U.S. PATENT DOCUMENTS

| | | |
|---|---|---|
| 7,994,999 B2 | 8/2011 | Maeda et al. |
| 8,174,455 B2 | 5/2012 | Miyoshi et al. |
| 9,070,985 B2 | 6/2015 | Wang |
| 2008/0001832 A1 | 1/2008 | Murakami et al. |
| 2008/0316117 A1* | 12/2008 | Hill ........................ H01Q 21/30 343/702 |
| 2009/0051383 A1 | 2/2009 | Ruf et al. |
| 2009/0315785 A1 | 12/2009 | Yang |
| 2012/0092220 A1 | 4/2012 | Tani et al. |
| 2012/0169547 A1* | 7/2012 | Oh .......................... H01Q 1/44 343/702 |
| 2012/0319922 A1 | 12/2012 | Fuchs |
| 2013/0154886 A1 | 6/2013 | Isohatala |
| 2013/0249744 A1 | 9/2013 | Jang et al. |
| 2014/0125528 A1 | 5/2014 | Tsai et al. |
| 2014/0292589 A1* | 10/2014 | Park ........................ H01Q 1/243 343/702 |

FOREIGN PATENT DOCUMENTS

| | | |
|---|---|---|
| CN | 103390793 A | 11/2013 |
| CN | 103531911 A | 1/2014 |
| EP | 2562867 | 2/2013 |
| KR | 101529027 B1 | 6/2015 |
| WO | WO-2012153282 A1 | 11/2012 |

\* cited by examiner

ANTENNA AND CAP

CROSS-REFERENCE TO RELATED APPLICATIONS

This application is a continuation of U.S. patent application Ser. No. 15/772,080, filed on Apr. 30, 2018, which is a 371(c) National Phase Application of International Application No. PCT/US2016/018725, filed Feb. 19, 2016, both of which are herein incorporated by reference in their entireties.

BACKGROUND

An antenna may be used to facilitate wireless communication. An antenna including a cap may be used in connection with a computing device to facilitate wireless communication of the computing device.

DETAILED DESCRIPTION

Computing devices can include an antenna to send and/or receive signals. For example, an antenna can be used in conjunction with a computing device to facilitate voice and for data transfer. In some examples, an antenna can be used in conjunction with a computing device to facilitate telephonic communication, web access, voice over IP, gaming, high-definition mobile television, video conferencing, etc. However, space constraints associated with some computing device form factors and/or some material choices may impact antenna placement and/or antenna performance.

For example, as mobile and/or portable computing devices (referred to generally herein as "computing devices") become smaller, thinner, and/or lighter, component placement within the device may present challenges. For example, challenges involving antenna placement may arise when an antenna associated with a computing device is disposed near a microphone, speaker, port (e.g., a universal serial bus), etc. of the computing device. Computing devices, as used herein, include smartphones, phablets, handheld computers, personal digital assistants, carputers, wearable computers, laptops, tablet computers, laptop/tablet hybrids, etc.

In some examples, it may be desirable to provide computing device components (e.g., computing device components disposed on the interior and/or exterior of the computing device) that include conductive materials. In some approaches, this can lead to decreased antenna performance due to decreased radiation performance of an antenna in the presence of such conductive materials. Notably, examples described herein can allow for an antenna that may function in the presence of computing device components including a conductive material.

Examples of the disclosure include methods, systems, and apparatuses employing an antenna and cap. For example, a system may include a computing device, a clearance region coupled to the computing device, and an antenna comprising a first antenna portion and a second antenna portion, the first antenna portion coupled to the computing device and to the clearance region, and the second antenna portion coupled to the clearance region. In some examples, a system may include a first cap coupled to the second antenna portion via a first interconnection, and a second cap coupled to the second antenna portion via a second interconnection. The first cap and the second may be coupled to the computing device.

Figure 1:
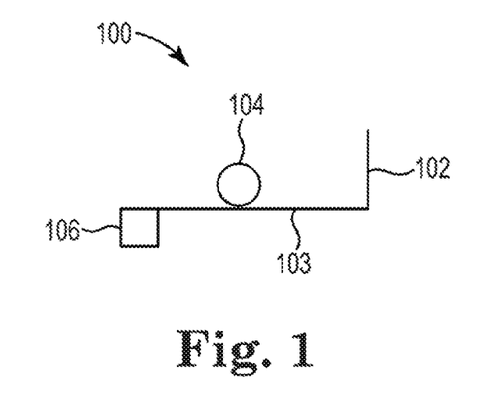
FIG. 1 illustrates a diagram of an example of a system according to the disclosure.

FIG. 1 illustrates a diagram of an example of a system 100 according to the disclosure. As shown in FIG. 1 the system 100 can include a first antenna portion 102, a second antenna portion 103, a signal source 104, and a port 106. In some examples, the first antenna portion 102 and/or the second antenna portion 103 may form an antenna capable of receiving and/or transmitting wide-band and/or multi-band electronic signals such as those corresponding to voice and/or data signals.

In some examples, the first antenna portion 102 and/or the second antenna portion 103 may be formed on a printed circuit board (PCB). At least a portion of the first antenna portion 102 and/or the second antenna portion 103 may be connected to a system ground associated with a computing device. In some examples, the second antenna portion 103 can be in physical contact with the port 106. The port may be a universal serial bus (USB), or other port or bus capable of providing communication and/or power supply to and/or from a computing device.

Figure 2:
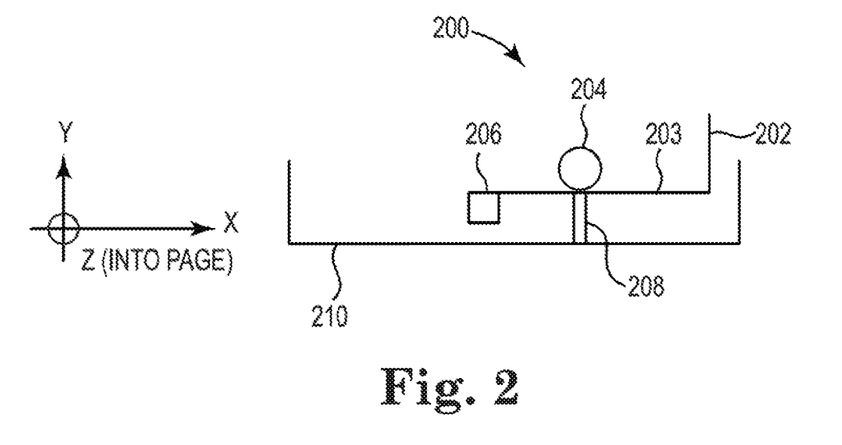
FIG. 2 illustrates a diagram of an example of a system including an antenna and cap according to the disclosure.

FIG. 2 illustrates a diagram of an example of a system including an antenna and cap according to the disclosure. As shown in FIG. 2, the system 200 can include a first antenna portion 202, a second antenna portion 203, a signal source 204, a port 206, and/or a first cap 210, as described in more detail herein. As used herein, a "cap" is a cover or piece of material that may be coupled to a portion of a computing device to form an exterior portion of the computing device. An example of a cap is a piece of material coupled to a portion of a computing device to provide protection to components disposed therein and/or to cover components disposed therein. As illustrated in FIG. 2, the first antenna portion 202 may be disposed along a first direction (e.g., the y-direction), and the second antenna portion 203 may be disposed along a second direction (e.g., the x-direction).

Figure 3:
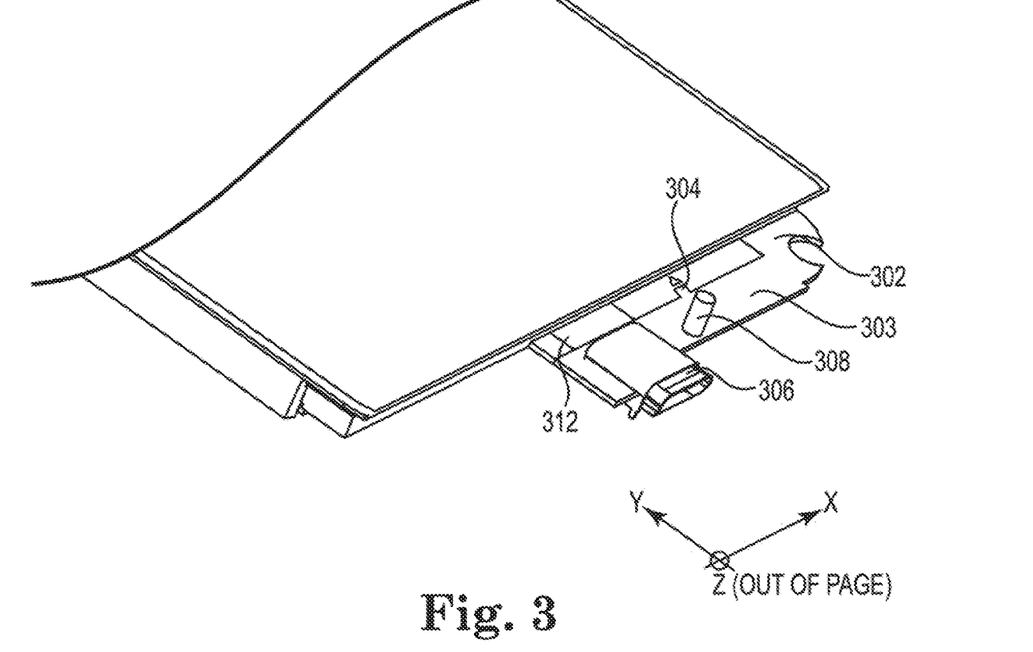
FIG. 3 illustrates a diagram of an example of a computing device including an antenna according to the disclosure.

FIG. 3 illustrates a diagram of an example of a computing device including an antenna according to the disclosure. As shown in FIG. 3, an antenna including a first antenna portion 302 and a second antenna portion 303 may be coupled to a computing device. In some examples, the antenna may be coupled to a clearance region 312. The clearance region 312 may be formed such that it is devoid of a conductive material. For example, the clearance region 312 may be formed such that there is no copper, gold, or other conductive material in the clearance region 312. In some examples, a first interconnection 308 may be coupled to the antenna.

The first interconnection may be formed of a conductive material, for example, a metal (e.g., steel, copper, conductive alloys, etc.).

In some examples, the first antenna portion 302 and/or the second antenna portion 303 may be excited by a signal received by a signal source 304. The signal source 304 may be disposed in the clearance region 312. As used herein, a "signal source" is a location where a signal (e.g., a radio frequency signal) is generated or received. In some examples, the first antenna portion 302, second antenna portion 303, and clearance region 312 can operate as an inverted-F antenna. As illustrated in FIG. 3, a port 306 may be in contact with a portion of the second antenna portion 303 and/or clearance region 312. As illustrated in FIG. 3, the first antenna portion 302 may be disposed along a first direction (e.g., the y-direction), the second antenna portion 303 may be disposed along a second direction (e.g., the x-direction), and the first interconnection 308 may be disposed along a third direction (e.g., the z-direction).

Figure 4:
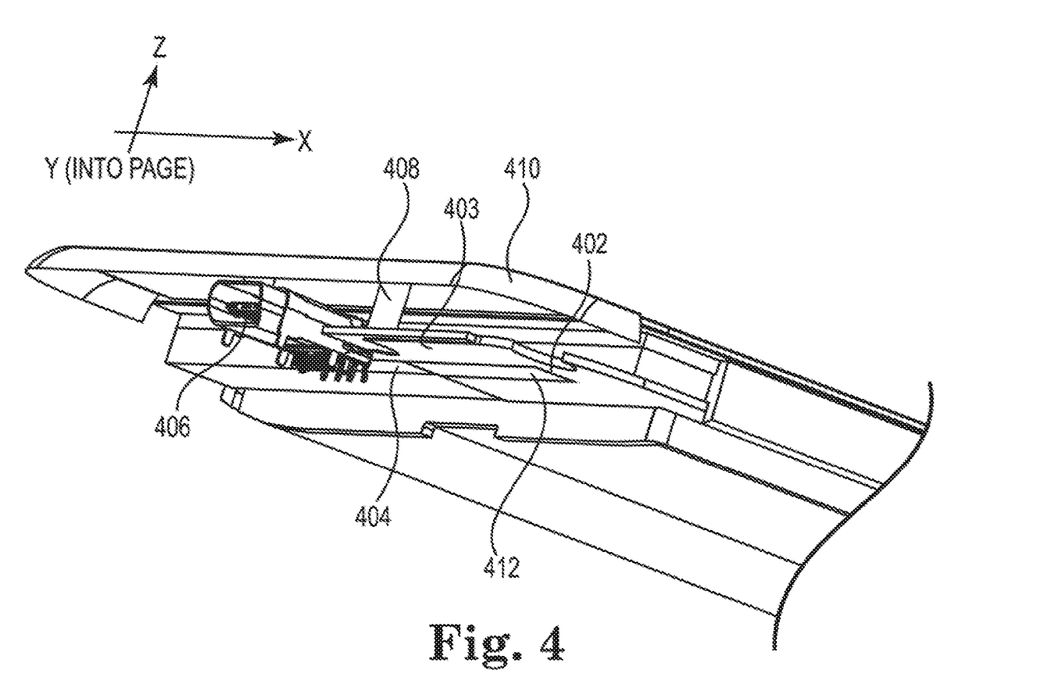
FIG. 4 illustrates a diagram of an example of a computing device including an antenna and cap according to the disclosure.

FIG. 4 illustrates a diagram of an example of a computing device including an antenna and cap according to the disclosure. As shown in FIG. 4, the first antenna portion 402 and/or the second antenna portion 403 may be coupled to a first interconnection 408. In some examples, the first antenna portion 402 and/or the second antenna portion 403 may be excited by a signal received by a signal source 404. First interconnection 408 may be coupled to first cap 410. In some examples, first interconnection 408 and/or first cap 410 can be comprised of a conductive material. For example, the first interconnection 408 and/or the first cap 410 can be comprised of metal.

In some examples, the first antenna portion 402, second antenna portion 403, clearance region 412, first interconnection 408, and first cap 410 may operate as a planar type antenna structure. For example, the first antenna portion 402, second antenna portion 403, clearance region 412, first interconnection 408, and first cap 410 may operate as a planar inverted-F antenna. As shown in FIG. 4, a portion of the first antenna portion 402, the second antenna portion 403, and/or clearance region 412 may be in physical contact with at least a portion of port 406. As illustrated in FIG. 4, the first antenna portion 402 may be disposed along a first direction (e.g., the y-direction), the second antenna portion 403 may be disposed along a second direction (e.g., the x-direction), and the first interconnection 408 may be disposed along a third direction (e.g., the z-direction).

Figure 5:
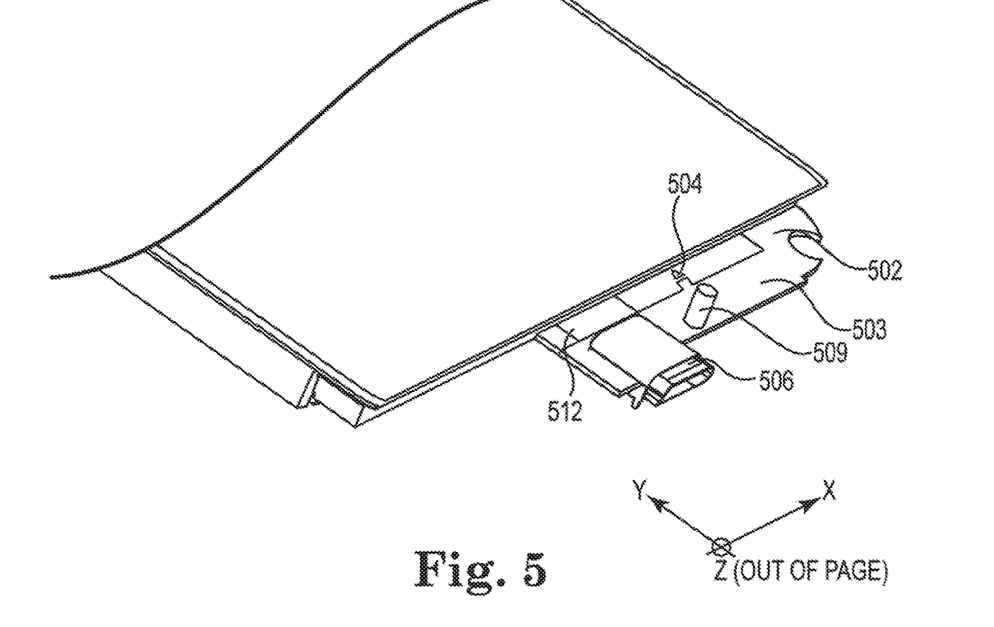
FIG. 5 illustrates a diagram of a example of a computing device including an antenna according to the disclosure.

FIG. 5 illustrates a diagram of an example of a computing device including an antenna according to the disclosure. As shown in FIG. 5, an antenna including a first antenna portion 502 and a second antenna portion 503 may be coupled to a computing device. In some examples, the antenna may be coupled to a clearance region 512. In some examples, a second interconnection 509 may be coupled to the antenna. The second interconnection may be formed of a conductive material. In some examples, the first antenna portion 502 and/or the second antenna portion 503 may be excited by a signal received by signal source 504. The signal source 504 may be disposed in the clearance region 512. In some examples, the first antenna portion 502, second antenna portion 503, and clearance region 512 can operate as an inverted-F antenna. In FIG. 5, a port 506 may be in contact with a portion of the second antenna portion 503 and/or clearance region 512.

As illustrated in FIG. 5, the first antenna portion 502 may be disposed along a first direction (e.g., the y-direction), the second antenna portion 503 may be disposed along a second direction (e.g., the x-direction), and the second interconnection 509 may be disposed along a third direction (e.g., the z-direction).

Figure 6:
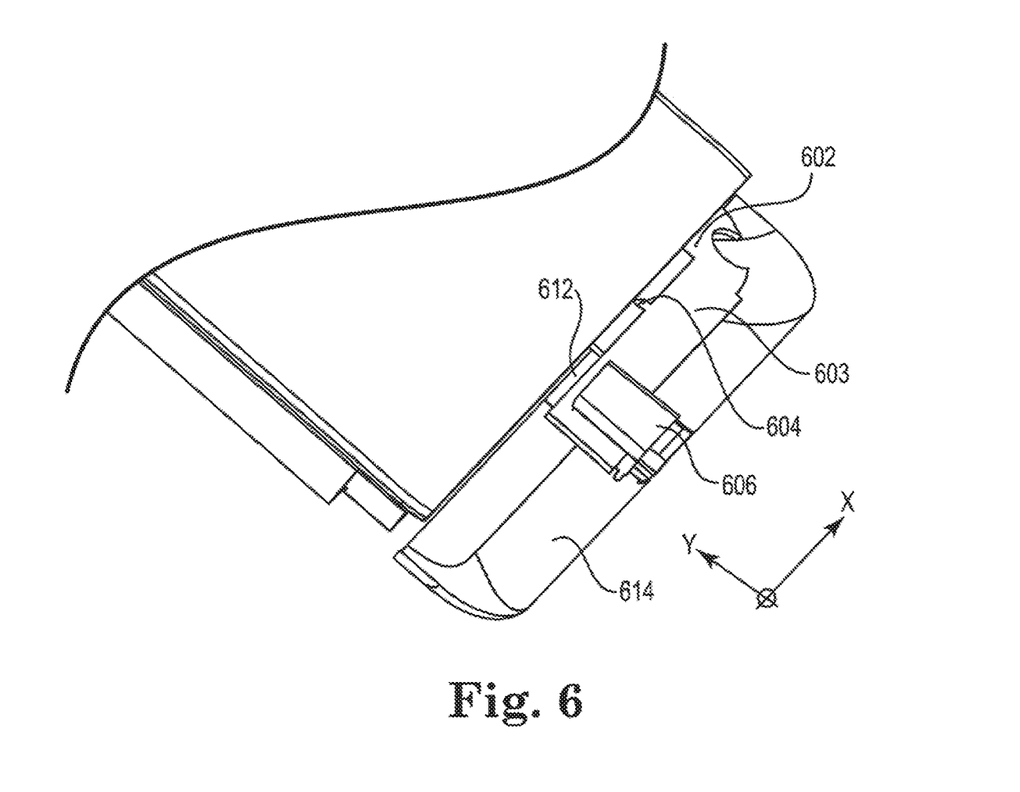
FIG. 6 illustrates a diagram of an example of a computing device including an antenna and cap according to the disclosure.

FIG. 6 illustrates a diagram of an example of a computing device including an antenna and cap according to the disclosure. In FIG. 6, a "bottom view" of what is shown in FIG. 5 is shown. For example, the example of FIG. 6 is shown with the z-direction of FIG. 5 extending into the page. As shown in FIG. 6, an antenna including a first antenna portion 602 and a second antenna portion 603 may be coupled to a computing device. In some examples, the antenna may be coupled to a clearance region 612. Second cap 614 may be coupled to second antenna portion 603 via a second interconnection (e.g., second interconnection 509 illustrated in FIG. 5).

In some examples, the first antenna portion 602, second antenna portion 603, clearance region 604, and second cap 614 may operate as a planar type antenna structure. For example, the first antenna portion 602, second antenna portion 603, clearance region 612, and second cap 614 may operate as a planar inverted-F antenna. As shown in FIG. 6, a portion of the first antenna portion 602, second antenna portion 603, and/or clearance region 612 may be in physical contact with at least a portion of port 604.

Figure 7:
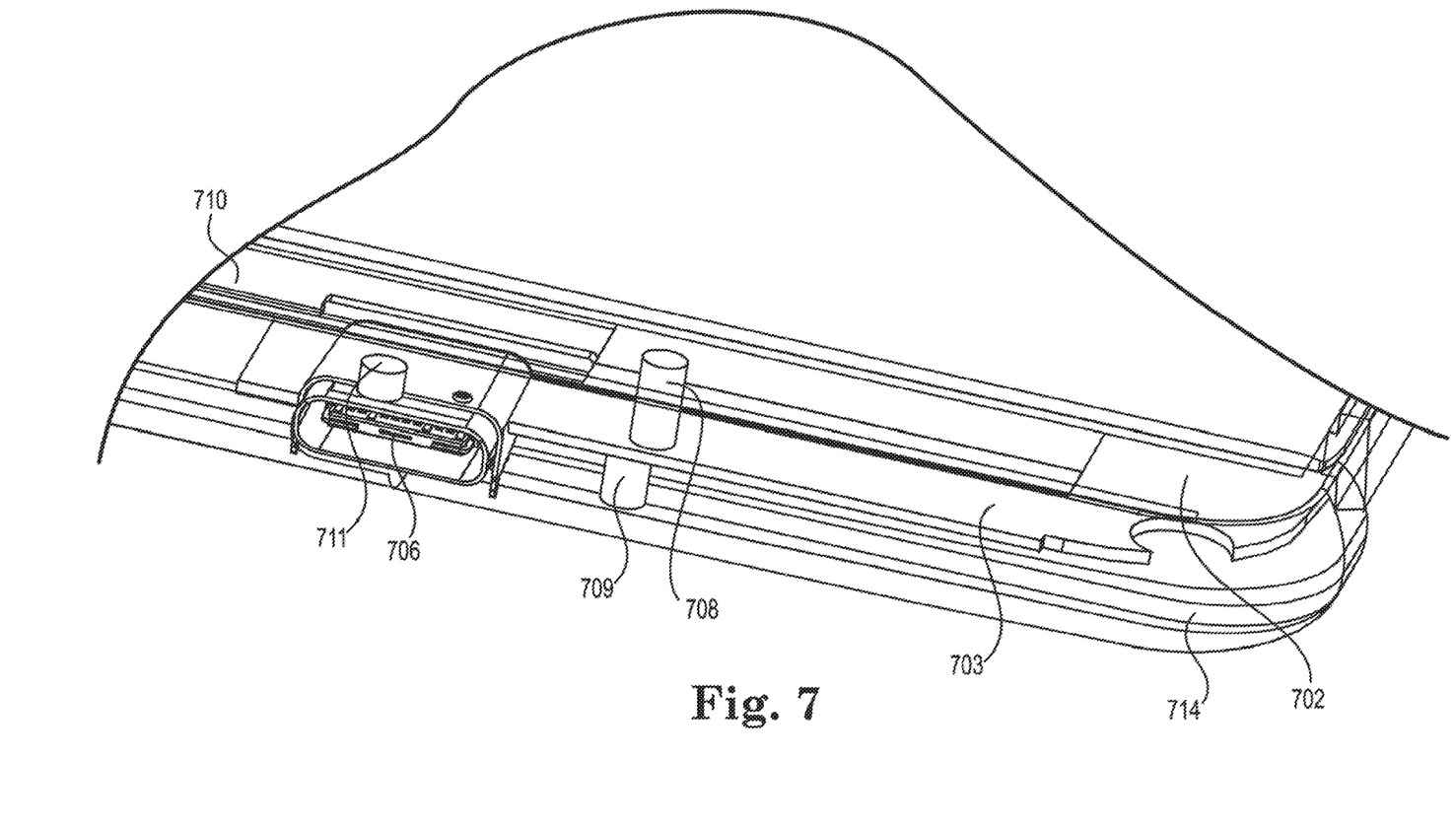
FIG. 7 illustrates a diagram of an example of a computing device including an antenna, a first cap, a second cap, and at least two interconnections according to the disclosure.

FIG. 7 illustrates a diagram of an example of a computing device including an antenna, a first cap, a second cap, and at least two interconnections according to the disclosure in FIG. 7, first interconnection 708 may be coupled to a portion of the antenna (e.g., second antenna potion 703) at one end, and may be coupled to first cap 710 at the other end. Second interconnection 709 may be coupled to a portion of the antenna (e.g., second antenna potion 703) at one end, and may be coupled to second cap 714 at a second end. The relative positions of where the first interconnection 708 and the second interconnection 709 are coupled to the second antenna portion 703 can be chosen such that they are physically close to one another.

As illustrated in FIG. 7, the first antenna portion 702 may be disposed along a first direction (e.g., the y-direction) the second antenna portion 703 may disposed along a second direction (e.g., the x-direction), the first interconnection 708 may be disposed along a third direction (e.g., the upward z-direction), and the second interconnection 709 may be disposed along a fourth direction (e.g., the downward z-direction).

For example, as illustrated in FIG. 7, an apparatus according to the disclosure may include a first antenna portion 702 disposed along a first direction and a second antenna portion 703 disposed along a second direction. The second direction may be substantially orthogonal to the first direction. The apparatus may include a clearance region coupled to the first antenna portion 702 and the second antenna portion 703. For clarity, clearance region is not specifically shown in FIG. 7; however, the clearance region is analogous to clearance regions 312, 412, 512, 612 as illustrated in FIGS. 3-6. A first interconnection 708 may be coupled to the second antenna portion 703 at a first end and coupled to a first cap 710 at a second end. In some examples, the third interconnection 708 may be disposed along a third direction (e.g., an upward z-direction). The third direction may be substantially orthogonal to a plane formed by the first direction and the second direction. In some examples, the apparatus may include a second interconnection 709 coupled to the second antenna portion 703 at a first end and coupled to a second cap 714 at a second end. The fourth interconnection 709 may be disposed along a fourth direction that is substantially opposite the third direction (e.g., a downward z-direction).

In some examples, the clearance region may be devoid of a conductive material. For example, if the first antenna portion 702 and the second antenna portion 703 are provided as part of a PCB, the clearance region may be etched such that there is no conductive metal present in the clearance region.

In some examples, the first interconnection 708 and the second interconnection 709 may comprise a conductive material (e.g., a metal and/or metal alloy). In some examples, a third interconnection 711 may be coupled to the second antenna portion 703 at a first end and may be coupled to the first cap 710 at a second end. The third interconnection 711 may be disposed along the third direction. In some examples, the third interconnection 711 may be coupled to port 706 at one end, and may be coupled to first cap 710 at the other end. The third interconnection 711 may be formed of a conductive material. In some examples, the first interconnection 708, second interconnection 709, and/or third interconnection 711 can operate as grounding points for the antenna. The relative positions of first interconnection 708, second interconnection 709, and/or third interconnection 711 may be chosen in a manner consistent with tuning the antenna. In some examples, at least one of the first interconnection 708, second interconnection 709, and/or third interconnection 711 can be a pogo pin, spring clip, etc.

In some examples, port 706 may be in physical contact with at least a portion of the second antenna portion 703. The apparatus may include a signal source (e.g., signal source 104, 204, 304, 404 504, 604 illustrated in FIGS. 1-6) disposed in the clearance region. In some examples, the first cap 710 and/or the second cap 714 may be comprised of a conductive material. In some examples, the first cap 710 and/or the second cap 714 can be comprised, at least in part, of a conductive material.

In some examples, a system 700 may include a computing device, a clearance region (e.g., clearance region 312, 412, 512, 612 illustrated in FIGS. 3-6) coupled to the computing device, and an antenna comprising a first antenna portion 702 and a second antenna portion 703. The first antenna portion 702 may be coupled to the computing device and to the clearance region, and the second antenna portion 703 may be coupled to the clearance region. A first cap 710 may be coupled to the second antenna portion 703 via a first interconnection 708, and a second cap 714 may be coupled to the second antenna portion 703 via a second interconnection 709. In some examples, the first cap 710 and the second cap 714 may be coupled to the computing device.

In some examples, the first cap 710 may be coupled to the second antenna portion 703 via a third interconnection 711. At least a portion of the antenna formed by first antenna portion 702 and second antenna portion 703 may comprise a PCB. As noted above, the first cap 710, the second cap 714, the first interconnection 708, and/or the second interconnection 709 may comprise a conductive material.

Figure 8:
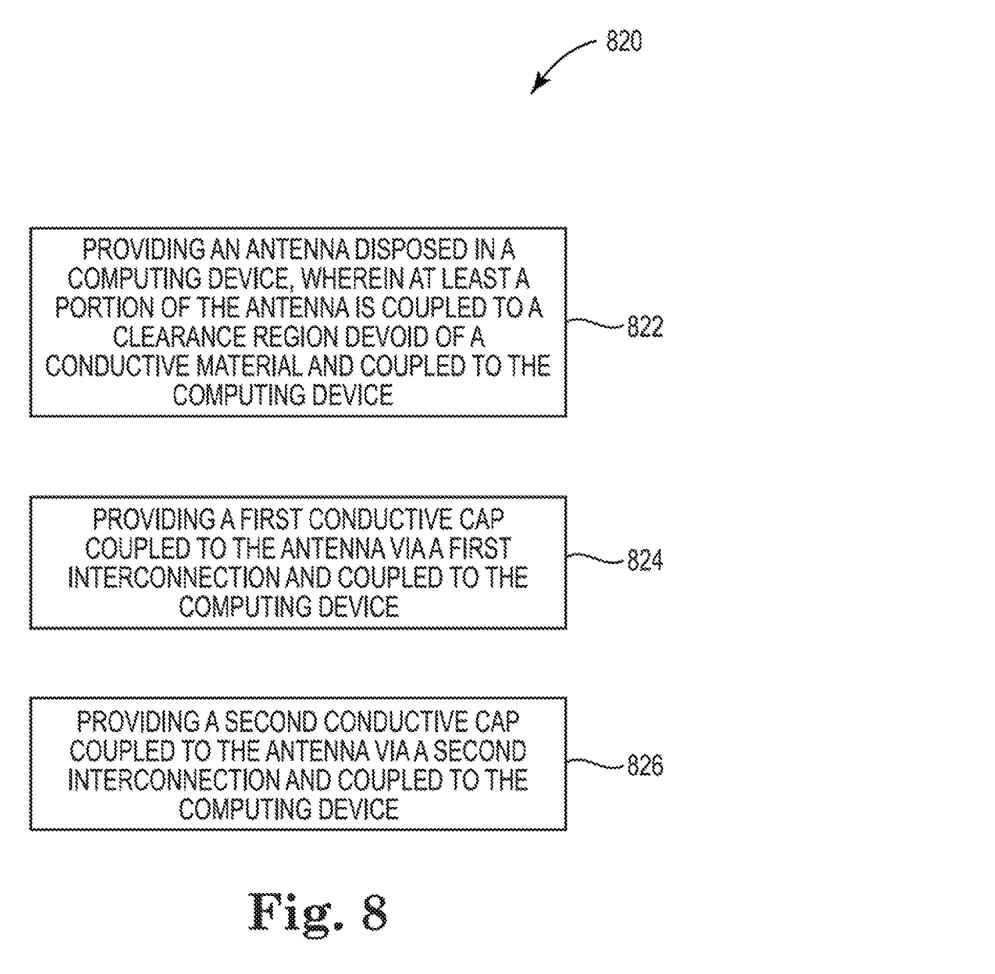
FIG. 8 illustrates a flow diagram of an example of a method for an antenna and cap according to the disclosure.

FIG. 8 illustrates a flow diagram of an example of a method 820 for an antenna and cap according to the disclosure. At 822, the method 820 can include providing an antenna disposed in a computing device, where at least a portion of the antenna is coupled to a clearance region devoid of a conductive material and coupled to the computing device.

At 824, the method 820 can include providing a first conductive cap coupled to the antenna via a first interconnection and coupled to the computing device. In some examples, the first conductive cap can be analogous to first cap 410, 710 illustrated in FIGS. 4 and 7. The antenna can be analogous to the antenna formed by first antenna portion 102, 202, 302, 402, 502, 602, 702 and second antenna portion 103, 203, 303, 403, 503, 603, 703 as illustrated in FIGS. 1-7. In some examples, the first interconnection may be analogous to first interconnection 208, 308, 408, 708 illustrated in FIGS. 2-4 and 7.

At 826, the method 820 can include providing a second conductive cap coupled to the antenna via a second interconnection and coupled to the computing device. In some examples, the second conductive cap can be analogous to second cap 614, 714 in FIGS. 6 and 7. The antenna can be analogous to the antenna formed by first antenna portion 102, 202, 302, 402, 502, 602, 702 and second antenna portion 103, 203, 303, 403, 503, 603, 703 as illustrated in FIGS. 1-7. In some examples, the second interconnection may be analogous to second interconnection 509, 709 illustrated in FIGS. 5 and 7.

In some examples, the method 820 can include providing a port coupled to at least a portion of the antenna. The port may be analogous to port 206, 306, 406, 506, 606, 706 illustrated in FIGS. 2-7. In some examples, a USB port may be provided and coupled to at least a portion of the antenna. In some examples, the method can include providing a signal source disposed in the clearance region. The signal source may be analogous to signal source 104, 204, 304, 404, 504, 604 illustrated in FIGS. 1-6.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 110 may refer to element "10" in FIG. 1 and an analogous element may be identified by reference numeral 210 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. As used herein, "a number of" an element and/or feature can refer to one or more of such elements and/or features.

As used herein, "substantially" refers to a characteristic that is close enough to the absolute characteristic to achieve the same functionality. For example, substantially orthogonal directions can be directions that, even if not aligned perfectly at 90 degrees, are close enough to 90 degrees to achieve the characteristic of being at 90 degrees.

What is claimed:
1. An antenna comprising;
   a first antenna portion, the first antenna portion coupled to a clearance region, wherein a signal source is disposed in the clearance region;
   a second antenna portion coupled to the first antenna portion;
   a first interconnection coupled to the second antenna portion at a first end and coupled to a first cap at a second end; and a third interconnection coupled to a port and to the second antenna portion at a first end and coupled to the first cap at a second end, wherein the port is coupled to the clearance region.

2. The antenna of claim 1, wherein at least a portion of the antenna comprises a printed circuit board.

3. The antenna of claim 1, wherein the first cap and the third interconnection comprise a conductive metal.

4. The antenna of claim 1, wherein a position of the third interconnection comprises a tuned position.

5. The antenna of claim 1, wherein the third interconnection is a grounding point.

6. An antenna comprising:
 a first antenna portion disposed along a first direction;
 a second antenna portion disposed along a second direction, the second direction being substantially orthogonal to the first direction;
 a first interconnection coupled to the second antenna portion at a first end and coupled to a first cap at a second end, the first interconnection disposed along a third direction substantially orthogonal to a plane formed by the first direction and the second direction; and
 a third interconnection coupled to the second antenna portion at a first end and coupled to the first cap at a second end, the third interconnection disposed along the third direction and coupled to a clearance region wherein a signal source is disposed in the clearance region.

7. The antenna of claim 6, wherein the clearance region is devoid of a conductive material.

8. The antenna of claim 6, wherein the first interconnection and the third interconnection comprise a conductive metal.

9. The antenna of claim 6, wherein the third interconnection is a grounding point.

10. The antenna of claim 6, wherein a position of the third interconnection comprises a tuned position.

11. The antenna of claim 6, wherein the first cap is comprised, at least in part, of a conductive material.

12. A method comprising:
 providing a first antenna portion disposed in a computing device, wherein at least a portion of the first antenna portion is coupled to a clearance region devoid of a conductive material and coupled to the computing device, wherein a signal source is disposed in the clearance region;
 providing a second antenna portion coupled to the first antenna portion;
 providing a first interconnection coupled to the second antenna portion at a first end and coupled to a first conductive cap at a second end;
 providing a third interconnection coupled to a port and to the second antenna portion at a first end and coupled to the first conductive cap at the second end; and
 providing the port, wherein the port is coupled to the third interconnection and the clearance region.

13. The method of claim 12 wherein a position of the third interconnection comprises a tuned position.

14. The method of claim 12 wherein the third interconnection is a grounding point.

15. The method of claim 12, wherein the first cap and the third interconnection comprise a conductive metal.

* * * * *